United States Patent [19]

Brown et al.

[11] 4,366,175

[45] Dec. 28, 1982

[54] GLAZED LIVER COATED BISCUIT OR KIBBLE FOR PETS

[76] Inventors: Bruce W. Brown, P.O. Box 600, Medina, Tex. 78055; Virgil E. Copple, 233 Gruene Rd., New Braunfels, Tex. 78130; Carroll K. Wilson, 1128 Winston, El Paso, Tex. 79907

[21] Appl. No.: 172,216

[22] Filed: Jul. 25, 1980

Related U.S. Application Data

[63] Continuation-in-part of Ser. No. 927,798, Jul. 25, 1978, Pat. No. 4,229,485.

[51] Int. Cl.$^3$ .............................................. A23K 1/10
[52] U.S. Cl. ...................................... 426/92; 426/96; 426/623; 426/805; 426/646
[58] Field of Search ................................... 426/92–94, 426/96, 623, 646, 512, 513, 805, 518

[56] References Cited

U.S. PATENT DOCUMENTS

| | | | |
|---|---|---|---|
| 3,808,340 | 4/1974 | Palmer | 426/92 |
| 3,808,341 | 4/1974 | Rongey et al. | 426/92 |
| 3,968,255 | 7/1976 | Hass et al. | 426/33 |
| 4,229,485 | 10/1980 | Brown et al. | 426/305 |

FOREIGN PATENT DOCUMENTS

| | | |
|---|---|---|
| 1412772 | 5/1975 | United Kingdom . |
| 1465267 | 2/1977 | United Kingdom . |

*Primary Examiner*—Hiram Bernstein
*Attorney, Agent, or Firm*—Fulwider, Patton, Rieber, Lee & Utecht

[57] ABSTRACT

A dried cereal based pet food composed of farinaceous and proteinaceous materials encapsulated within a glazed coating composed of liver and farinaceous material, the combination of which has a synergistic effect that excites the taste buds of the pet more than either of the highly palatable ingredients taken separately. In a preferred form, the matrix of farinaceous and proteinaceous material is formed to provide a core of desired shape and baked to less than 18% moisture by weight. While the shaped matrix is extremely hot, i.e., having an internal temperature in excess of 200° F., it is immersed in a meaty coating of farinaceous material and liver having a lower temperature. A portion of the coating material is thereafter trapped within the core by a second baking that forms a hard crust of glazed, dried meaty substance on the exterior to encapsulate the matrix. In a further preferred embodiment the core is formed of uncooked farinaceous material combined with finely divided flakes of uncooked meat or meat by-product.

5 Claims, No Drawings

GLAZED LIVER COATED BISCUIT OR KIBBLE FOR PETS

CROSS-REFERENCE TO RELATED APPLICATION

This application is a continuation-in-part of application Ser. No. 927,798 filed July 25, 1978, now U.S. Pat. No. 4,229,485.

FIELD OF THE INVENTION

The field of art to which the invention pertains includes the field of edible material, particularly pet food in the form of bone-shaped biscuits, cookies or kibbles.

BACKGROUND AND SUMMARY OF THE INVENTION

This invention relates to novel foods for animals and to methods of making the same. More particularly, it relates to dried farinaceous and proteinaceous meaty products having a substantially higher palatability than other coated products presently used in the trade. It also has a high nutritional and caloric value and may be used as a maintenance food, stored and marketed in nonrefrigerated containers without the need of hermetically sealed containers. The product can be provided in the form of small kibbles or, as preferred, in greater than bite-size, for example in the form of large, molded bone-shaped pieces. Particularly in the latter form, the product has a uniformly palatable taste throughout, that is, the biscuit is palatable when bitten into as well as when first taken into the pet's mouth. The products do not become mushy when served with liquid but retain their dry, solid characteristics and retain their meaty characteristic.

Dog and cat foods are commonly prepared as either meal-type rations or canned-type rations and are commonly formulated from a combination of proteinaceous and farinaceous materials. The proteinaceous material is derived from either vegetable protein sources or from meat and/or meat by-products, and nutritional supplements are often added. Meal-type animal foods have a dry, cereal-like texture and low moisture content, typically about 10%. They usually have a very high nutritional and caloric value providing a complete balanced diet for the animal, and excellent storage characteristics, thus permitting the use of relatively inexpensive packaging techniques. However, the palatability of many dry meal-type animal foods is poor and, in many cases, the animal will not eat them at all in dry form, necessitating the addition of liquids prior to their consumption. Liquid addition can cause the products to become mushy and on that basis could be rejected by the animal.

Canned-type animal foods having a meat-like texture and high-moisture content are generally received quite favorably by animals, apparently due in part to their meaty-texture, consistency and aroma. However, the elevated moisture content of such products requires thermal processing in sealed containers to obtain a commercially sterile product, thereby adding considerably to product costs. Furthermore, once such a can is opened, it must be quickly consumed since the product is quite conducive to supporting microbiological growth and hence will deteriorate very rapidly unless stored under refrigeration.

In addition to the two foregoing general types of animal foods, intermediate moisture products, having a moisture content in the range of about 15%-30%, have also been made available. In order to avoid microbiological decomposition, such products must be specially processed, e.g., by thorough pasteurization, and/or by being packaged in hermetically sealed containers and commercially sterilized, or maintained in a frozen or refrigerated state.

Another approach is to disperse an aqueous phase of water soluble solids uniformly throughout the product, the soluble solids being principally sugar at a level high enough to exert a bacteriostatic effect sufficient to stabilize the animal food. Such a product is illustrated by Burgess U.S. Pat. No. 3,202,514. The high sugar content of such products is not palatable to all animals, nor is it nutritionally sound.

It has also been proposed, in Palmer U.S. Pat. No. 3,808,340, to provide composite animal feed products of varying moisture contents by encasing a relatively unpalatable central core material within an outer cover which both conceals and masks the flavor and appearance of the core and presents the appearance, taste and texture of a natural meat product. Because of the comparatively low palatability of the core material, the outer meaty coating of such product comprises a substantial portion of the composite product—up to as much as about 65% by weight thereof. The Palmer product thus combines relatively unpalatable core materials with thick coatings of meaty cover layers in an effort to improve the palatability thereof.

There has not heretofore been provided an animal food product which has both the uniform high palatability associated with the meaty texture of canned food and the convenience and high nutritional value associated with meal-type foods. The present invention provides such products.

In particular in accordance with this invention there is provided a dry cereal-based pet food comprising a solid core comprising at least about 40% by weight of a farinaceous material and from about 5-25% of a proteinaceous material, encapsulated within a continuous glazed coating containing at least 50% by weight liver and farinaceous material, the combination of which core and coating excites the taste buds of the pet more than either of the highly palatable components taken separately. The matrix of farinaceous and proteinaceous material is preferably formed to provide a core of desired shape and baked to less than 18% (preferably less than 15%) moisture, desirably from about 8-15% moisture, by weight. While the shaped matrix is extremely hot. i.e., at an internal temperature in excess of 200° F., the product is immersed in a meaty coating of farinaceous material and liver having a lower temperature. A portion of the coating material is drawn into the matrix and thereafter trapped within the core by a second baking that forms a hard crust of dried meaty substance on the exterior to encapsulate the matrix. As indicated hereinabove, the resulting coating contains at least 50% liver by weight exclusive of the moisture content thereof and has less than an 18% total moisture content. The coating is provided in thicknesses as such that it constitutes only from about 2-20% by weight of the composite product, yet provides a hard, glazed crust, greatly enhancing the product's attractiveness to pets.

In a preferred embodiment of the invention, the cores are formed from a combination of uncooked farinaceous material and meat or meat by-product in a particular form. Specifically, the meat or meat by-product is uncooked and in the form of finely cut flakes. This is combined with the uncooked farinaceous material, such as wheat, and blended to form a pasty dough which is molded into discrete pieces. The pieces are then baked at a temperature sufficiently high, e.g., 350°–650° F., to provide dry, solid cores having moisture contents of less than 18%, preferably less than 15%, by weight. The baked cores are coated with the high liver content coating, as above, then subjected to a second baking step, again at a preferred temperature of about 350°–650° F., to reduce the moisture content of the outer coating to less than 18% (preferably less than 15%) by weight, preferably to a range between 8% and 18%, desirably 8–15%, by weight. The result is a product having high palatability throughout, and having a surface which does not become mushy when immersed in water or other liquid. The product is hard and solid, yet meaty in taste. With the simple addition to the core formulation of an antioxidant and an antimycotic agent, the product can be packaged using relatively inexpensive techniques and stored without spoilage.

It is particularly advantageous for the core to be formed of uncooked (that is other than as a result of the baking step) meat or meat by-product which is in the form of finely cut flakes, preferably having its largest dimension in the range of 15/1000 inch to 300/1000 inch. The flakes are blended with farinaceous material, such as wheat, serving as an adhesive to form a pasty dough, preferably without adding water. In addition, one can add a small amount of a source of edible oil, such as soy oil or soybeans, which not only adds protein but also serves to bring out the meaty flavor and helps with molded pieces in release of the product from the mold. One can also add other ingredients such as ground corn, for example in the form of flour, to add additional flavor and aroma to the biscuit. The following ranges of core ingredients, wherein percentages are by weight, are suitable.

| Finely cut flakes of uncooked meat or meat by-product | 5–25% |
| Ground uncooked wheat | 40–93% |
| Ground corn | 0–20% |
| Source of edible oil, calculated as oil | 2–15% |

The components are blended to form a pasty dough. To obtain molded biscuits, the dough is fed into a pair of opposing plates defining cavities in the desired shape, such as bones, and then molded therein. The molded pieces are then baked under time and temperature conditions sufficient to form the desired dry, solid, molded product. For example, the pieces can be baked at a temperature of about 350°–600° F. for five minutes to an hour, conveniently in a continuous oven to reduce moisture content to less than 18% by weight, preferably to a range between 8% and 18%, desirably 8–15%. The high temperature used in the baking step is particularly important to achieving a dry solid surface that resists mushing, whereas the prior art has found that palatability suffers when such high temperatures are used (e.g. Ludington et al U.S. Pat. No. 3,119,691). Products of the present invention have a high degree of palatability perhaps as a result of combining such a high temperature in the baking step with the use of finely cut flakes of meat or meat by-product.

Critical to successful coating in accordance with the present invention is the use of a slurry of comminuted liver, preferably beef liver, in sufficient concentration, at least 50% by weight of the slurry exclusive of moisture, to provide a glazed, encapsulating coating when baked. Vegetable enzyme is preferably added to the coating formulation. Up to about 3% by weight is useful to keep the liver in a liquid state, prevent coagulation and keep it non-fibrous. The enzyme becomes active at 86° F. and deteriorates at 122° F. so that it is lost in baking. One can also add ground whole wheat which acts as a binder to hold the coating together. Various colors and flavoring can be added to simulate different meat flavors and appearances. Antioxidant and antimycotic agents can be added and sufficient water is added to achieve the desired viscosity.

Whether being applied to kibble-like pieces or to the preferred baked combination of uncooked farinaceous material and finely cut flakes of uncooked meat or meat by-product, the combination of high liver content and high temperature baking provides a glazed encapsulation presenting to the animal a highly attractive textural, olfactory and visual combination. Particularly, the preferred double baked product has high palatability throughout. Accordingly, large sized pieces can be provided, greater than bite-size (4 cm. long or larger) which can be bitten into by the animal without loss of palatability.

PREFERRED EMBODIMENTS OF THE INVENTION

The preferred products of the present invention are prepared by coating the appropriate core component with the glazed liver outer coating component and drying the respective components to the specified moisture ranges, as described more fully hereinafter. The blend of farinaceous material and meat or meat by-product comprising the core may be in the form of kibble-like pieces or otherwise. When in kibble form, it may be prepared by extrusion through conventional cold forming extrusion equipment to form pieces, for example one inch long and ¼ inch cross sectional diameter. The extruded pieces can be tumbled to round the edges and then dried by heating in a conventional hot air oven to reduce the moisture content to less than 18%, preferably less than 15%, by weight.

In a preferred form of the invention, the product is double baked, the core materials being formed with a combination of (a) uncooked farinaceous material and (b) meat or meat by-product which is uncooked and in the form of finely cut flakes. Meat or meat by-product in this form is to be contrasted with meat or meat by-product which is comminuted by grinding or other such process. The meat or meat by-product can be cut into flakes by processing through a cutting screen wherein pieces are fed by a revolving impeller into contact with sharp vertical knives separated one from another by a distance which provides the preferred size range of 15/1000 inch to 250/1000 inch. such processing equipment is commercially available, for example, as sold under the trademark "Comitrol" by Urschel Laboratories, Incorporated, Valparaiso, Ind. Such processing is distinct from conventional comminuting apparatus which grinds, crushes, hammers, mashes, tears or rips.

The meat or meat by-product is fed fresh or frozen in small pieces (generally five or six inches or smaller when fresh and two or three inches or smaller when frozen). The output can then be blended directly with various farinaceous and vegetable proteinaceous material without the addition of water.

As meat, one can use any boneless beef, pork, veal, lamb, poultry or fish, either fresh or frozen. Thus, the term "meat" is understood to apply not only to the flesh of cattle, swine, sheep and goats, but also to horses, whales, and other mammals, poultry and fish. The term "meat by-products" refers to those non-rendered parts of the carcasses of slaughtered animals, including but not restricted to mammals, poultry and the like, and including such constituents as liver, kidney, heart, spleen, tongue, trimmings, lungs and skins, embraced by the term "meat by-product" in the *Definition of Feed Ingredients* published by the Association of American Feed Control Officials, Inc.

It is important that the meat or meat by-product be subjected to a pure cutting action as above referred to rather than to grinding, crushing, hammering, mashing, tearing or ripping. It is the division into finely cut flakes, together with the adhesiveness of the farinaceous material, which provides the unique characteristics giving rise to the resultant high palatability properties of the product.

After the meat or meat by-product is cut into fine flakes, it is blended with the other ingredients, principally with farinaceous material. By "farinaceous material" is meant those foodstuffs containing a preponderance of starch and/or starch-like material. Examples are cereal grains and meals or flours obtained upon grinding cereal grains such as corn, oats, wheat, milo, barley, rice and the various milling by-products of the cereal grains such as wheat feed flour, wheat middlings, wheat mixed feed, wheat shorts, wheat red dog, oat groats, hominy feed, and any other such material. Also included as sources of farinaceous ingredients are the tuberous foodstuffs such as potatoes, tapioca, or the like. Preferably, the farinaceous material is glutenous such as wheat and serves as an adhesive for the dough, the gluten component providing a tenacious elastic protein that gives cohesiveness to the dough and enhances the elasticity of the mixture. In addition to wheat, corn flour is an advantageous, inexpensive source of flavoring and aroma which enhances the flavor imparted to the product by the meat or meat by-product. The corn flour also provides additional protein and serves as an additional source of edible oil.

In addition to the farinaceous material, there is added a source of edible oil to enhance the baking of the biscuit and to aid in releasing molded dough from the die. One could use soybean oil, cottonseed oil, corn oil, or other vegetable oil, or one can use a source of such oil such as soybeans which release oil during the molding process. Soy oil or soybeans are preferred as bringing out the flavor of the meat or meat by-product as well as serving as a releasing agent for the molded product.

In addition to the foregoing ingredients, one can advantageously add effective amounts of an antioxidant as normally used in the food industry. For example, one can utilize butylated hydroxytoluene (BHT), butylated hydroxyanisole (BHA), ethoxyquin, or the like, in an amount sufficient to effect the desired antioxidant properties in the product, generally less than 1.0% by weight of the product. In addition to an antioxidant, one may also use an effective amount of an antimycotic as a preservative and mold inhibitor. Examples of such materials include the edible benzoates or propionates such as sodium benzoate and calcium propionate, as well as sorbate salts, such as potassium sorbate, in an amount sufficient to prevent mold and bacterial growth within the product, each generally less than 1.0% by weight of the product. Salt can be added, e.g. about 0.5-4%, as a natural source of chlorine, to bring out the flavor of the finished product and to aid in preserving the product. Up to 20% animal fat can be added if desired. Additives such as vitamins, minerals and coloring matter may be added at the blending stage although as a result of using the meat or meat by-product and farinaceous and proteinaceous material referred to above, such supplementation is not necessary with the present product.

The ingredients can be blended to a pasty dough, placed into the cavities of a mold and pressed into the desired shape. The shaped product is then placed on the conveyor belt of a continuous oven and passed through a heating zone at 350°-600° F. for a time sufficient to reduce the moisture content to less than 18% (preferably less than 15%) by weight, desirably to a range of 8%-15%.

The core material, whether kibble-like in size and form or whether molded as biscuits, is coated with a slurry of comminuted liver. In this regard, the slurry contains liver, preferably beef liver, as its key and major component. The liver is comminuted, which can be conveniently carried out in the Comitrol described above or by any other process. It is suspended in a solution of water to form a slurry and may be supplemented by a variety of other ingredients. For example, other meat or meat by-product components, such as spleen or the like can be added. One can add meat tenderizer to soften the fibrous material in the liver. Soy oil can be added to contribute to gloss and sheen. One can add ground broken cores obtained from prior processing, as well as food colors of various types to simulate the visual appearance of various meat coatings. Antioxidants and antimycotic agents can also be added. One can also add such ingredients as whole egg or glycerine to provide additional glazing. Condiments such as garlic and onion can be added as can charcoal flavoring or the like.

The cores are dipped into the liver slurry by being carried therethrough on a porous belt but other methods could be used such as tumbling or the like. Preferably, particularly when the cores are formed of the aforenoted combination of cut flakes of uncooked meat and uncooked farinaceous material, the cores are dipped into the cooler coating liquid while the cores are at a temperature greater than 200° F., preferably while the cores are hot from the prior baking step. A portion of the coating material is drawn into the matrix and thereafter entrapped within the cores by the subsequent baking step which forms a hard crust of glazed, dried meaty substance on the exterior to encapsulate the matrix. Following application of the coating, the product is baked for a time and temperature sufficient to reduce the moisture content to less than 18%, preferably less than 15%, by weight. Thus the product can be placed on the conveyor belt of a continuous oven and passed through a heating zone at 350°-600° F. In the preferred form of the invention, when a double baking cycle is used, the coating can be applied as the molded cores are emerging from a first continuous baking oven and then fed into a continuing section of the oven to complete the second baking step. As indicated hereinabove, the coating constitutes about 2-20% by weight of the product.

The following specific examples, in which all percentages are by weight, further illustrate the invention:

EXAMPLE 1

The following ingredients are blended to form a pasty dough:

| Ingredients | Percent by Weight |
| --- | --- |
| Finely cut flakes of uncooked beef spleen | 12.8 |
| Ground uncooked wheat | 63.8 |
| Ground soybean (defatted) meal | 17.0 |
| Corn flour | 4.3 |
| Salt | 2.0 |
| BHT and BHA (50% each) | 0.08 |
| Potassium sorbate | 0.08 |

The uncooked beef spleen is fed into a Comitrol 2100 meat processing machine equipped with a cutting head in which the separation of the vertical blades is 90/1000 inch to yield cut flakes of the meat by-product 90/1000 inch in their largest dimension. The wheat is ground in a Prater Pav 10C rotary centrifugal mill with a 2 mm. screen. The soybean meal is ground through a 30/1000 inch screen in the Comitrol. The above ingredients are then placed in a mixer and blended to a pasty dough which is placed into a mold and shaped into bones about 4 inches long. The bones are then baked in a continuous oven 150 feet long at 500° F. for 17 minutes to yield dry solid molded pieces having a moisture content of less than 15% weight percent and having high palatability throughout.

While still hot, the molded pieces are led immediately into a slurry bath containing the following ingredients:

| Ingredients | Percent by Weight |
| --- | --- |
| Beef liver | 29.3 |
| Ground whole wheat (2 mm) | 17.2 |
| Water | 51.72 |
| Caramel color (powder) | 1.0 |
| Red color (powder) | 0.02 |
| Vegetable enzyme | 0.34 |
| Beef flavoring - by-product | 0.34 |
| Potassium sorbate | 0.04 |
| BHT | 0.02 |
| BHA | 0.02 |

The beef liver constitutes 60.7% of the coating formulation, exclusive of moisture. It is ground through a 3-K 30030-D screen in a Comitrol. The ground beef liver and water are then put in a high speed mixer and mixed for 2 minutes. The vegetable enzyme is then added to the mixture which is then mixed again for 2 minutes at high speed. The remaining materials are added and the combination is mixed at high speed for 3 minutes to obtain a slurry. The resulting bath is maintained above 80° F., the activation temperature of the enzyme, but below 122° F., the enzyme deterioration temperature.

The molded pieces as they emerge from the 150 foot oven are led through a bath containing the above slurry and then led into another section of continuous oven 50 feet long and baked at 450° F. for six minutes. The product is then cooled in a cooling tower to a temperature of 70° F. to 90° F. and then packaged. The product is of high palatability throughout and has a continuous glaze with the appearance and flavor of glazed beef. The uncoated "bones" weigh about one ounce each, the coating adding about 10% by weight.

EXAMPLE 2

The procedure of Example 1 is repeated except that the slurry has the following ingredients:

| Ingredients | Percent by Weight |
| --- | --- |
| Beef liver | 29.2 |
| Ground whole wheat (2 mm) | 17.2 |
| Water | 51.5 |
| Vegetable enzyme | 0.3 |
| Caramel color | 1.7 |
| BHT | 0.02 |
| BHA | 0.02 |
| Potassium sorbate | 0.04 |

The beef liver constitutes 60.2% of the coating formulation, exclusive of moisture. The product obtained has the visual surface appearance and flavor of glazed liver.

EXAMPLE 3

The procedure of Example 1 is followed except that the slurry has the following ingredients:

| Ingredients | Percent by Weight |
| --- | --- |
| Beef liver | 29.6 |
| Ground whole wheat (2 mm) | 17.4 |
| Water | 52.2 |
| Vegetable enzyme | 0.35 |
| Chicken flavoring - by-product | 0.35 |
| BHT | 0.02 |
| BHA | 0.02 |
| Potassium sorbate | 0.04 |

The beef liver constitutes 62.0% of the coating formulation, exclusive of moisture. The product has the surface appearance and flavor of glazed chicken.

EXAMPLE 4

The following ingredients are blended to form a pasty dough:

| Ingredients | Percent by Weight |
| --- | --- |
| Finely cut flakes of uncooked beef liver | 15.0 |
| Ground wheat | 49.9 |
| Corn oil | 2.0 |
| Soybean meal | 5.0 |
| Corn flour | 12.5 |
| Milo | 15.0 |
| BHT and BHA (50% each) | .06 |
| Potassium sorbate | .06 |

The beef liver is ground through a 30/100 inch screen in a Conitrol 2100 meat processor. The wheat and milo are ground in a Prater Pav 10C centrifugal mill with a 2 mm. screen. The soybean meal is ground through the 30/100 screen of the Comitrol. The ingredients are placed in the mixer and blended into a pasty dough. After mixing thoroughly, moisture of the product is found to be between 32% and 33%. The product is placed in a mold and shaped into bones which are then baked in a continuous oven at 500° F. for 17 minutes to yield cores having a moisture content of less than 15%.

While still hot the molded pieces are led into a slurry bath containing the following ingredients:

| Ingredients | Percent by Weight |
|---|---|
| Beef liver | 47.60 |
| Textured vegetable protein (soybean, dried and flaked) | 1.19 |
| Ground broken cores | 11.90 |
| Caramel color | 1.58 |
| Beef flavoring | 7.93 |
| Red color | 0.03 |
| Water | 29.75 |

The beef liver constitutes 67.8% of the coating formulation, exclusive of moisture. The slurry is prepared and applied, and the product is baked and packaged, following the procedure of Example 1. The result is a product having the surface appearance and flavor of glazed beef.

EXAMPLE 5

The procedure of Example 4 is followed except that the slurry has the following ingredients:

| Ingredients | Percent by Weight |
|---|---|
| Beef liver | 48.37 |
| Textured vegetable protein | 1.21 |
| Ground broken cores | 12.09 |
| Bacon and egg flavoring | 8.06 |
| Yellow color (liquid) | 0.038 |
| Water | 30.23 |

The beef liver constitutes 68.5% of the coating formulation, exclusive of moisture. The product has the surface flavor of bacon and egg.

EXAMPLE 6

The procedure of Example 4 is followed except that the slurry contains the following ingredients:

| Ingredients | Percent by Weight |
|---|---|
| Glycerin | 2.39 |
| Beef liver | 57.39 |
| Ground broken cores | 14.35 |
| Caramel color | 1.91 |
| Beef flavoring | 9.57 |
| Red color | .04 |
| Water | 14.35 |

The beef liver constitutes 67.0% of the coating formulation, exclusive of moisture. The product has the surface appearance and flavor of beef.

EXAMPLE 7

Cores are prepared from the following ingredients:

| Ingredients | Percent by Weight |
|---|---|
| Wheat flour | 25.0 |
| Soybean meal | 25.0 |
| Cracked barley | 20.0 |
| Cornstarch (modified) | 3.7 |
| Water | 26.3 |

The core material is blended and then extruded through conventional cold forming extrusion equipment to form small pieces approximately one inch long and ¼ inch cross sectional diameter. The extruded pieces are then tumbled to round the edges and then dried by heating in a conventional hot air oven at 250° F. for 30 minutes. The pieces are then tumbled in an pan-coating machine containing a slurry having the following ingredients:

| Ingredients | Percent by Weight |
|---|---|
| Beef liver | 40.0 |
| Soy oil | 6.7 |
| Ground cores | 10.0 |
| Caramel color | 0.5 |
| Potassium sorbate | 0.3 |
| BHA | 0.3 |
| BHT | 0.3 |
| Red color | 0.2 |
| Water | 41.7 |

The beef liver constitutes 68.6% of the formulation, exclusive of moisture. The cores and slurry are tumbled together for approximately 3 minutes so the coating is dispersed evenly over the surface of the core material. The coated cores are then baked at 450° F. for 6 minutes in a continuous oven to produce a product having a glazed liver coating.

EXAMPLE 8

The procedure of Example 7 can be repeated substituting the core material of Example 1 for that used in Example 7.

EXAMPLES 9, 10, 11

The procedure of Example 1 can be repeated substituting horse meat, deboned chicken and deboned fish, respectively, for the beef spleen.

EXAMPLE 12

The following ingredients are blended to form a pasty dough:

| Ingredients | Percent by Weight |
|---|---|
| Whole ground wheat | 54.84 |
| Meat and bone meal | 9.25 |
| Whole ground corn | 2.96 |
| Bone regrind | 2.77 |
| Salt | 1.48 |
| Potassium sorbate | 0.02 |
| Vitamin and mineral premix | 0.10 |
| Water | 28.67 |

The whole wheat and corn are ground in a Prater Pav 10C rotary centrifugal mill with a 2 mm. screen. The above ingredients are then placed in a mixer and blended to a pasty dough which is placed into a mold and shaped into bones about 4 inches long. The bones are then enrobed in a slurry bath containing the following ingredients:

| Ingredients | Percent |
|---|---|
| Rolled oat groats | 11.76 |
| Red #40 | .03 |
| Water | 88.21 |

A slurry is produced by mixing the above ingredients together in a steam jacketed kettle, and cooked to 190° F. for 10–12 minutes with agitation. The oat starch thickens the slurry so that it readily coats the wet bones. The bones are then baked in a continuous oven 150 feet long at 585° F. for 26 minutes to yield dry solid molded pieces having a moisture content of less than 10 weight percent.

While still hot the molded pieces are enrobed with a second slurry containing the following ingredients:

| Ingredients | Percent by Weight |
| --- | --- |
| Beef liver | 46.42 |
| Boneless beef | 6.18 |
| Poultry viscera | 9.29 |
| Spice onion powder | .21 |
| Garlic powder | .10 |
| Salt | .72 |
| Charoil | .81 |
| Potassium Sorbate | .06 |
| Red #40 | .05 |
| Water | 36.11 |

The beef liver and boneless beef constitute 82.33% of the coating formulation, exclusive of moisture. The ingredients are mixed with a high speed mixer.

Immediately after the second enrobement the molded pieces are then let into another section of continuous oven 50 feet long and baked at 450° F. for six minutes. The thus finished bone is thereafter packaged.

The finished product has a moisture content of less than 13% by weight. A high gloss together with a "meaty"-like outer texture which appears like glazed beef is imparted to the finished product by the multiple coatings formed thereon.

We claim:

1. A pet food product in the form of dry, solid pieces having high palatability throughout, each comprising a solid core comprising at least 40% of a farinaceous material and from 5–25% by weight of a proteinaceous material, said core containing from 8 to 18% by weight moisture content and being encapsulated in a continuous glazed liver coating containing at least 50% by weight liver on a dry basis and having less than an 18% by weight moisture content, and said coating constituting from 2–20% by weight of the product.

2. The pet food of claim 1, in which the proteinaceous material of said core comprises substantial quantities of finely cut flakes of uncooked meat or meat by-product.

3. The pet food of claim 1, in which the farinaceous material of said core comprises substantial quantities of ground uncooked cereal grains.

4. The pet food of any of claims 1, 2 or 3, in which the core is a palatable, dry solid piece comprising the following ingredients on a dry weight basis:

| | |
| --- | --- |
| Finely cut flakes of uncooked meat or meat by-product, said flakes having their largest dimension in the range of 15/1000 to 250/1000 inch | 5–25% |
| Ground uncooked wheat | 40–93% |
| Ground corn | 0–20% |
| Source of edible oil, calculated as oil | 2–15% |

5. The pet food of claim 4, in which said source of edible oil is selected from soybeans and soy oil.

* * * * *

UNITED STATES PATENT AND TRADEMARK OFFICE
CERTIFICATE OF CORRECTION

PATENT NO. : 4,366,175
DATED : December 28, 1982
INVENTOR(S) : Brown et al

It is certified that error appears in the above-identified patent and that said Letters Patent is hereby corrected as shown below:

At column 4, line 57, delete "such" and insert -- Such --.

At column 4, line 65, delete "two or three" and insert -- two to three --.

At column 8, line 56, delete "Conitrol" and insert -- Comitrol --.

At column 9, last line, delete "an" and insert -- a --.

Signed and Sealed this

Twenty-ninth Day of March 1983

[SEAL]

Attest:

GERALD J. MOSSINGHOFF

Attesting Officer

Commissioner of Patents and Trademarks